(12) United States Patent
Xing (10) Patent No.: US 10,748,125 B2
(45) Date of Patent: Aug. 18, 2020

(54) SYSTEMS AND METHODS FOR DIGITAL MULTIMEDIA CAPTURE USING HAPTIC CONTROL, CLOUD VOICE CHANGER, PROTECTING DIGITAL MULTIMEDIA PRIVACY, AND ADVERTISING AND SELL PRODUCTS OR SERVICES VIA CLOUD GAMING ENVIRONMENTS

(71) Applicant: Zhou Tian Xing, Tiburon, CA (US)

(72) Inventor: Zhou Tian Xing, Tiburon, CA (US)

( * ) Notice: Subject to any disclaimer, the term of this patent is extended or adjusted under 35 U.S.C. 154(b) by 932 days.

(21) Appl. No.: 15/365,840

(22) Filed: Nov. 30, 2016

(65) Prior Publication Data

US 2017/0076262 A1 Mar. 16, 2017

Related U.S. Application Data (63) Continuation-in-part of application No. 15/345,003, filed on Nov. 7, 2016, now Pat. No. 9,710,804, and a
(Continued)

(51) Int. Cl.
| | |
|---|---|
| *G06Q 20/12* | (2012.01) |
| *G06Q 30/02* | (2012.01) |
| *G06Q 20/36* | (2012.01) |
| *G06Q 20/06* | (2012.01) |
| *G06K 7/14* | (2006.01) |
| *A63F 13/792* | (2014.01) |

(52) U.S. Cl.
CPC ......... *G06Q 20/123* (2013.01); *A63F 13/792* (2014.09); *G06K 7/1413* (2013.01); *G06K 7/1417* (2013.01); *G06Q 20/065* (2013.01); *G06Q 20/36* (2013.01); *G06Q 30/0209* (2013.01); *G06Q 30/0267* (2013.01)

(58) Field of Classification Search
CPC ...... G06Q 2/123; G06Q 20/36; G06Q 20/065; G06Q 30/0209; G06Q 30/0267; G06K 7/1413; G06K 7/1417
See application file for complete search history.

(56) References Cited

U.S. PATENT DOCUMENTS

| | | | |
|---|---|---|---|
| 10,636,055 B2 * | 4/2020 | Koenig | G06F 3/165 |
| 2001/0000044 A1 * | 3/2001 | Lin | G06Q 40/04 705/26.3 |

(Continued)

*Primary Examiner* — Daniel I Walsh
(74) *Attorney, Agent, or Firm* — Steven A. Nielsen; www.NielsenPatents.com (57) ABSTRACT

Provided are computer implemented methods for combining online and offline gaming, advertising, and commerce and providing free games, free products, and free services. The method may commence with receiving a buying request associated with a product from a user. The method may continue with providing an incentive to the user to play a game and receiving an indication that the user intends to play the game. In response to the indication, a payment amount associated with the game may be transferred from a user account. The payment amount associated with the game may constitute a predetermined portion of a payment amount associated with the product. The method may include receiving results of the game played by the user. Based on the results of the game, the user may be selectively provided with a discount for the product. The discount may be equal to the payment amount associated with the game.

16 Claims, 5 Drawing Sheets

Related U.S. Application Data continuation-in-part of application No. 15/345,308, filed on Nov. 7, 2016, now abandoned, and a continuation-in-part of application No. 15/081,600, filed on Mar. 25, 2016, now Pat. No. 9,600,832, and a continuation-in-part of application No. 14/957,644, filed on Dec. 3, 2015, now Pat. No. 9,489,671, and a continuation-in-part of application No. 14/940,379, filed on Nov. 13, 2015, now Pat. No. 9,493,235, said application No. 14/957,644 is a continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565.

(56) References Cited

U.S. PATENT DOCUMENTS

| | | | | |
|---|---|---|---|---|
| 2002/0035474 | A1* | 3/2002 | Alpdemir | G10L 15/26 704/270 |
| 2002/0091569 | A1* | 7/2002 | Kitaura | G06Q 30/0273 705/14.26 |
| 2002/0169665 | A1* | 11/2002 | Hughes | G06Q 10/087 705/14.1 |
| 2003/0027635 | A1* | 2/2003 | Walker | A63F 13/00 463/40 |
| 2003/0125958 | A1* | 7/2003 | Alpdemir | G10L 15/26 704/275 |
| 2005/0234771 | A1* | 10/2005 | Register | G06Q 30/0226 705/14.25 |
| 2007/0276537 | A1* | 11/2007 | Walker | G07F 9/02 700/238 |
| 2008/0139306 | A1* | 6/2008 | Lutnick | G06Q 30/02 463/30 |
| 2008/0262928 | A1* | 10/2008 | Michaelis | G06Q 30/0225 705/14.26 |
| 2009/0240586 | A1* | 9/2009 | Ramer | G06F 16/9577 705/14.64 |
| 2010/0211431 | A1* | 8/2010 | Lutnick | G06Q 30/02 705/14.12 |
| 2012/0059699 | A1* | 3/2012 | Zhou | G06Q 30/0273 705/14.12 |
| 2014/0189354 | A1* | 7/2014 | Zhou | G06F 21/00 713/168 |
| 2015/0066613 | A1* | 3/2015 | Zhou | G07F 17/3255 705/14.12 |
| 2015/0193814 | A1* | 7/2015 | Eppinger | G06Q 30/0277 705/14.41 |
| 2015/0371215 | A1* | 12/2015 | Zhou | G06Q 30/0209 705/71 |
| 2016/0225019 | A1* | 8/2016 | Zhou | G06Q 30/02 |
| 2017/0076262 | A1* | 3/2017 | Xing | G06Q 30/0267 |

* cited by examiner

SYSTEMS AND METHODS FOR DIGITAL MULTIMEDIA CAPTURE USING HAPTIC CONTROL, CLOUD VOICE CHANGER, PROTECTING DIGITAL MULTIMEDIA PRIVACY, AND ADVERTISING AND SELL PRODUCTS OR SERVICES VIA CLOUD GAMING ENVIRONMENTS

RELATED PATENT APPLICATION AND INCORPORATION BY REFERENCE

This application is a continuation-in-part of U.S. patent Ser. No. 15/081,600, US Patent Application No: 2016/0225, 019, entitled "Systems and methods for digital multimedia capture using haptic control, cloud voice changer, protecting digital multimedia privacy, and advertising and sell products or services via cloud gaming environments" filed Mar. 25, 2016; This application is a continuation-in-part of U.S. patent application Ser. No. 15/345,003, entitled "VIRTUAL PAYMENT CARDS ISSUED BY BANKS FOR MOBILE AND WEARABLE"; filed Nov. 7, 2016; This application is a continuation-in-part of U.S. patent application Ser. No. 15/345,308; entitled "An amphibious vertical take off and landing unmanned device with AI data processing apparatus"; filed Nov. 7, 2016; these above three applications (which) claims priority of
U.S. patent application Ser. No. 14/815,988, entitled 'SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS', filed on Aug. 1, 2015, which is a continuation-in-part of U.S. patent application Ser. No. 14/034,509, entitled 'EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING', filed on Sep. 23, 2013, which is continuation of U.S. patent application Ser. No. 10/677, 098, entitled 'EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING', filed on Sep. 30, 2003, which claims priority to U.S. Provisional Patent Application No. 60/415,546, entitled 'DATA PROCESSING SYSTEM', filed on Oct. 1, 2002, which are incorporated herein by reference in their entirety.

FIELD

This application relates generally to data processing and, more specifically, to an Internet-based platform combining online gaming, online advertising, and online commerce.

BACKGROUND

Personal digital communication devices, such as smartphones, are evolving rapidly and more and more people prefer using personal digital communication devices for numerous purposes. One or the main functions of the personal digital communication devices is providing an access to the Internet. Conventionally, Internet and mobile Internet revenues mostly come from three sources: online shopping, advertising, and gaming. However, different activities are usually provided by different websites. A user who wants to combine several Internet activities, such as playing a game during performing online shopping, has to switch from one website to another or, in case the activity is associated with a user profile, enter user credentials at each website. Additionally, an ordinary person can participate in financial operations by using both client-server money transfer applications and peer-to-peer money transfer applications. An Internet connection allows to perform transactions world-wide. However, exchange costs, banking costs, and various fees related to transactions in physical currencies may be considerable. With a globalization of economy and growth of international operations, these inconveniences become more outstanding, interfere with retail transactions and add some level of dissatisfaction.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for combining online and offline gaming, advertising, and commerce and providing free games, free products, and free services free of interchange fees. The method for combining online and offline gaming, advertising, and commerce and providing free games, free products, and free services free of interchange fees may commence with receiving, by at least one processor, a buying request from a user. The buying request may be associated with a product or a service. The method may continue with providing an incentive to the user to play a game. The incentive may include a notification displayed to the user. The method may further include receiving an indication that the user intends to play the game. The indication may include a payment request associated with the game. In response to the indication, a payment amount associated with the game may be transferred from a user account. The payment amount associated with the game may constitute a predetermined portion of a payment amount associated with the product or the service. The method may further include receiving results of the game played by the user. Based on the results of the game, the user may be selectively provided with a discount for the product or the service. The discount may be equal to the payment amount associated with the game.

The system for combining online and offline gaming, advertising, and commerce and providing free games, free products, and free services free of interchange fees may include at least one processor. The processor may be operable to receive a buying request from a user. The buying request may be associated with a product or a service. The processor may be further operable to provide an incentive to the user to play a game. The incentive may include a notification displayed to the user. The processor may be further operable to receive an indication that the user intends to play the game. The indication may include a payment request associated with the game. The processor may be operable to receive results of the game played by the user. Based on the results of the game, the processor may selectively provide the user with a discount for the product or the service. The discount may be equal to the payment amount associated with the game. The system for combining online and offline gaming, advertising, and commerce and providing free games, free products, and free services free of interchange fees may further include a payment processing unit. The payment processing unit may transfer a payment amount associated with the game from a user account. The payment amount associated with the game may constitute a predetermined portion of a payment amount associated with the product or the service. In further exemplary embodiments, modules, subsystems, or devices can be adapted to perform the recited steps. Other features and exemplary embodiments are described below.

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for combining online and offline gaming, advertising, and commerce and providing free games, free products, and free services free of interchange fees are described herein. Recent proliferation of mobile and wearable devices (e.g., a mobile phone, a smartphone, a tablet personal computer (PC), a laptop, a wearable personal digital device, and other similar devices) that are capable of transmitting and receiving data via a network allows implementing these methods and systems. Most users of mobile and wearable devices enjoy online gaming, as well as performing online shopping using the mobile and wearable devices. Both online gaming and online shopping may be accompanied by advertising some products or services to the users.

The methods and systems of the present disclosure refer to a system for combining online and offline gaming, advertising, and commerce and providing free games, free products, and free services free of interchange fees. An application associated with the system can be directly run on any platform without special preparation. In particular, the system may run on Android, iOS, BlackBerry OS, Symbian, Windows Phone, and so forth. The methods and systems for combining online and offline gaming, advertising, and commerce and providing free games, free products, and free services free of interchange fees of the present disclosure provide a way to combine several types of Internet activities for a user. The system may be associated with a digital currency that may enable worldwide client-to-server and peer-to-peer transactions without banking commissions, legal boundaries, and currency exchange expenses.

The methods described herein may be performed by any mobile devices with wireless communication capabilities. In addition to being capable of transmitting voice-based signals, many modern cell phones have internet connectivity using cellular networks (e.g., 3G, 4G) as well as Wi-Fi and other types of networks. Some additional examples of such networks are described below with reference to FIG. 1. Wireless communication may be used to transmit retrieved product information to a payment server, receive replies, and transmit authorizations. Overall, various data may be exchanged between the mobile server and payment server as well as other servers during operations of the method.

More specifically, the system of the present disclosure may be an integrated platform including an online shop, an online game, and online advertising. For example, a user may access an online shop to search for and buy a desired product. On a web page of the desired product, a game interface may be displayed to the user. The game interface may display a notification motivating the user to play a game. For example, the notification may suggest playing the game for a 10% of a product price. After reviewing the notification, the user may decide to play the game. The user may pay the requested amount of money for playing the game by transferring money from a user personal account, such as a user bank account, to a game account. Alternatively, the user may be have a personal profile in the system and may have some amount of virtual currency on a user virtual wallet. The virtual currency may be associated with combining online and offline gaming, advertising, and commerce and providing free games, free products, and free services free of interchange fees and enabling worldwide client-to-server and peer-to-peer transactions between users without banking commissions, legal boundaries, and currency exchange expenses.

The virtual currency may include a global world universal digital mobile and wearable currency. Using the global world universal digital mobile and wearable of the present disclosure provides a way to avoid obstacles and expenses related to mobile peer-to-peer payments in international and domestic environment. A virtual currency being the basis of the system for combining online and offline gaming, advertising, and commerce and providing free games, free products, and free services free of interchange fees enables worldwide client-to-server and peer-to-peer transactions between the users without banking commissions, legal boundaries, and currency exchange expenses.

After receiving the transfer from the user, the system may provide the user with an access to the game. The user may play the game. Upon results of the game, the system may provide the user with various rewards. For example, in case the user wins the game, the system may provide the user with the product for free. In fact, the system may provide the user with a discount equal to 90% of the product price, taking into account that the user has already paid 10% of the product price for playing the game. Therefore, the user may get the product without paying additional money. As a result, by paying only 10% of the product price, the user may play the game and get the product.

Alternatively, in case the user loses the game, the system may provide the user with a 10% discount for buying the product. This means that the user may have to additionally pay only 90% of the product price. Therefore, the total amount paid by the user for playing the game and for buying the product may be equal to the product price. In other words, the user may get the product for the product price and play the game for free. The user may transfer the rest of the product price, i.e. 90% of the product price, from the user bank account or the user virtual wallet to a merchant virtual wallet. The merchant may be associated with the product. Additionally, the product may be provided to the system by merchants for free for the purpose of advertising. As the product may be shown to the user before and all the time during the game, the advertising of the product to the user is performed even in case the user refuses to buy the product after playing the game. Additionally, the online shop may provide a plurality of products for sale and, therefore, may serve as a price comparison shopping gateway. Therefore, merchants may use products and services instead of money as a paid, impersonal, one-way marketing of the product or service information to promote the adoption of goods, services or ideas.

Additionally, no interchange fees may be collected from the user when the user transfers money into the user virtual wallet, i.e. coverts money into virtual currency. Similarly, no interchange fees may be collected from the merchant when the merchant transfers money into the merchant virtual wallet.

The amount of virtual currency in the user virtual wallet may be represented in tokens of the global world universal digital mobile and wearable currency, also referred to as mobile and wearable digital currency tokens. The tokens may represent different values in the global world universal digital mobile and wearable currency. The users may customize the representation of the tokens using images. For example, the user may provide his image to be depicted on a 100 unit token. The images for token customizing may include an image of a sender face, an image of a public figure, an image of a movie character, and so forth.

In an example embodiment, the tokens may include a virtual digital note or a virtual digital coin payable on demand, a paper note being a substitute for the coin. Furthermore, the tokens may have one-dimensional or two-dimensional black-and-white cluster of dots and squares presenting a code. The code may include one or more of a QR-code, a barcode, and a machine readable code. The tokens may embed the code within an image, an animation, a video, a text resulting in a combination of the QR-code and multimedia being visually appealing and machine-readable. The tokens may be associated with a face detection or a code detection. The virtual digital note or the virtual digital coin may include one or more of a currency token, a community token, a city token, a company token, a shop token, a game token, a trade token, a merchant token, a gift token, a staff token, a sales tax token, a slot machine token, a kiosk token, and so forth.

Furthermore, the tokens may be a joint product of a mutual partnership between the merchant and a token issuer. Together, the merchant and the token issuer may create a token that bears the merchant name and provides merchant-specific benefits to brand-loyal consumers. As a result, not only token holders gain rewards and discounts from the companies they are most loyal to, but affiliated merchants also acquire an expanding customer database. The tokens may circulate in a community, a city, a county, a country, a group entity, an institution, an association, a shop, a company, or other entity or organization.

By using the methods of the present disclosure, users of the Internet may have a free processing payment platform providing free games, free products, no cash payments, and free advertising using the products.

Figure 1:
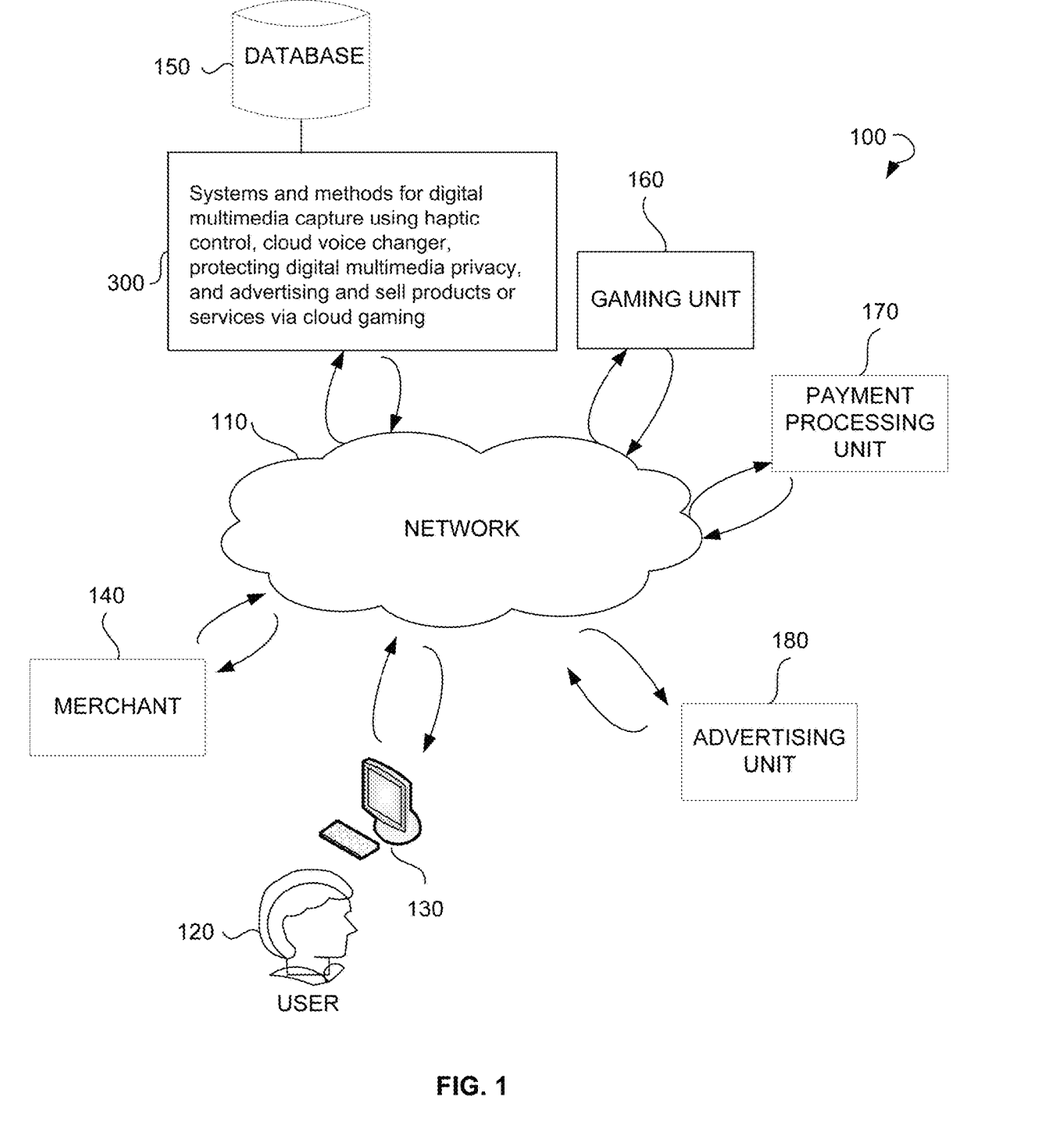
FIG. 1 is a block diagram illustrating an example of the overall system in which various embodiments may be implemented.

Referring now to the drawings, FIG. 1 illustrates an environment 100 within which a method and a system for combining online and offline gaming, advertising, and commerce and providing free games, free products, and free services free of interchange fees can be implemented. The environment 100 includes a network 110, a user 120, a user digital device 130, a merchant 140, a system 300 for combining online and offline gaming, advertising, and commerce and providing free games, free products, and free services free of interchange fees, a database 150, a gaming unit 160, a payment processing unit 170, and an advertising unit 180. The user digital device 130 may include a mobile phone, a lap-top, a PC, a tablet PC, a smart phone, a wearable personal digital device, a wearable eyeglass communication device, and so forth.

The network 110 includes the Internet or any other network capable of communicating data between devices. Suitable networks includes or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 includes a network of data processing nodes that are interconnected for the purpose of data communication.

The user 120 includes a person who intends to buy a product or a service of the merchant 140 in an online shop. Before selling the product or the service to the user 120, the gaming unit 160 suggests playing a game to the user 120. Using the payment processing unit 170, the user 120 may transfer, to the system 300, a predetermined amount of money for playing the game. During the game, the advertising unit 180 may display a picture of the product or the service, product data, or a service data to the user 120. Upon completion of the game, the user 120 may request to transfer, using the payment processing unit 170, the amount equal to the product price or a service price to a merchant account associated with the system 300. The system 300 may transfer the amount from a user account associated with the system 300 to a merchant account associated with the system 300.

Figure 2:
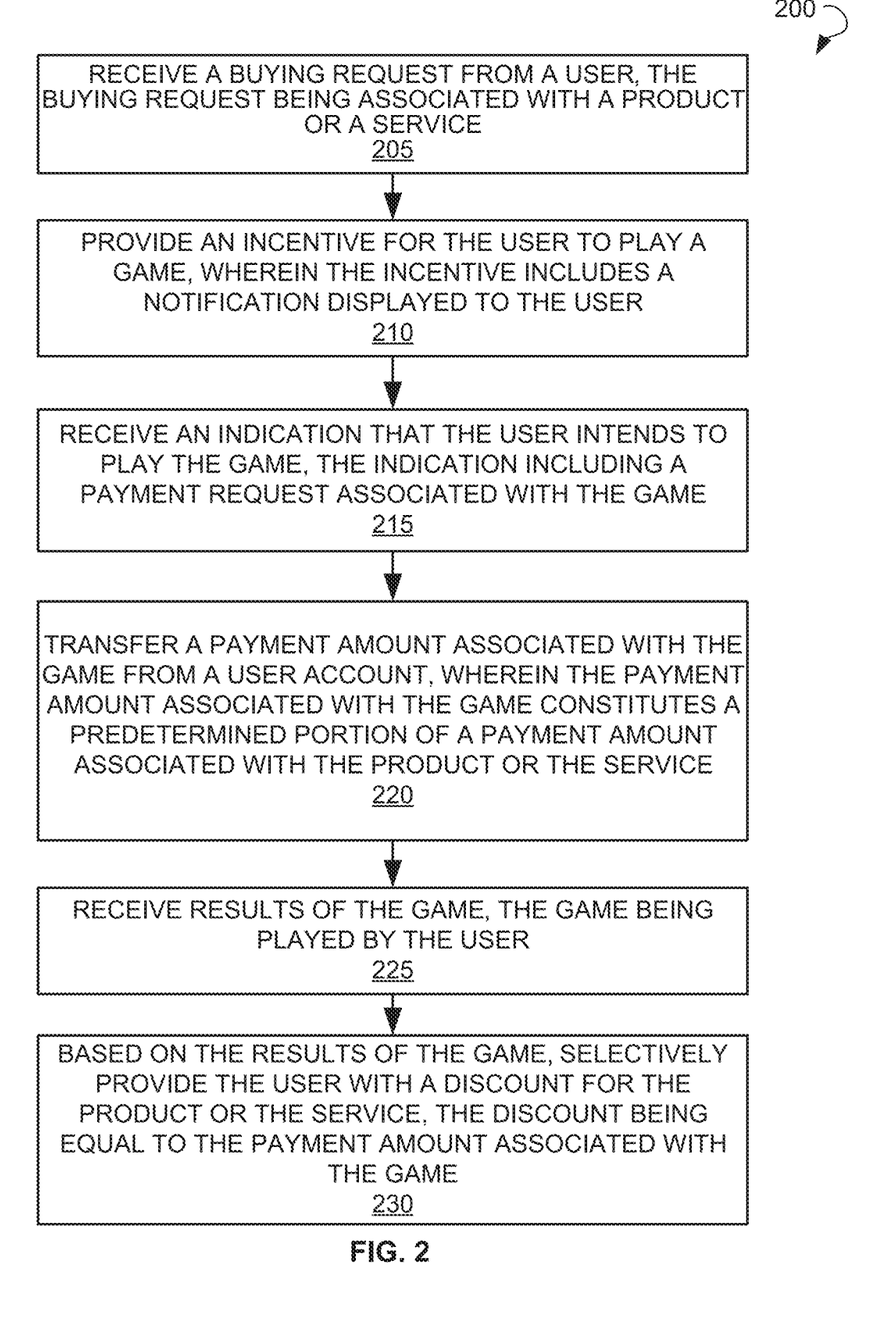
FIG. 2 is a flow chart illustrating a method for combining online and offline gaming, advertising, and commerce and providing free games, free products, and free services free of interchange fees, in accordance with certain embodiments.

FIG. 2 is a flow chart illustrating a computer implemented method 200 for combining online and offline gaming, advertising, and commerce and providing free games, free products, and free services free of interchange fees. The method 200 may commence with receiving, by at least one processor, a buying request from a user at operation 205. The buying request may be associated with a product or a service. At operation 210, an incentive to play a game may be provided to the user. For this purpose, a game interface may be provided on a web page associated with the product or the service. The incentive may include a notification displayed to the user. The notification may be displayed on the game interface. In an example embodiment, the game interface may be associated with a mobile device game, a tabletop game, a video game, an educational game, a letter game, a multiplayer game, a parlor game, a pervasive game, a puzzle, a skill game, a cloud game, a kiosk game, and so forth. The method 200 may continue with receiving an indication that the user intends to play the game at operation 215. The indication may include a payment request associated with the game. Upon receiving the payment request associated with the game, the method 200 may continue with transferring a payment amount associated with the game from a user account at operation 220. The user account may be associated with a user virtual wallet. The payment amount associated with the game may constitute a predetermined portion of a payment amount associated with the product or the service. The method 200 may further include operation 225 at which results of the game played by the user may be received. Based on the results of the game, the user may be selectively provided with a discount for the product or the service at operation 230. The discount may be equal to the payment amount associated with the game.

Additionally, method 200 may include selectively providing the user with a reward for the product or the service. The reward may be provided based on the results of the game. The reward may be equal to the payment amount associated with the product or the service.

Optionally, method 200 may comprise receiving product data or service data from a merchant. The product data may include product name, product description, product price, product picture, product logo, merchant data, and the like. In an example embodiment, the product data may be provided for the purpose of advertising. The service data may include one or more of the following: service name, service description, service price, service picture, service logo, and so forth.

The method 200 may further comprise receiving, from the user, a payment amount associated with the product or the service. The payment amount associated with the product or the service may be calculated based on the discount. The payment amount associated with the product or the service may be transferred from the user virtual wallet to a merchant account. The merchant account may be associated with a merchant virtual wallet. Additionally, the payment amount associated with the game may be transferred from the user virtual wallet to the merchant virtual wallet. Therefore, the merchant may receive the payment for the product or the service in two portions: the payment amount associated with the product or the service and the payment amount associated with the game. In an example embodiment, the user virtual wallet and the merchant virtual wallet are associated with virtual currency. In a further example embodiment, the method 200 may optionally comprise collecting a payment processing fee from the user and/or the merchant.

The method 200 may further comprise receiving, from the merchant, a cashout request. The cashout request may be associated with at least one of the payment amount associated with the product or the service and the payment amount associated with the game. Based on the cashout request, the at least one of the payment amount associated with the product or the service and the payment amount associated with the game may be transferred from the merchant virtual wallet to a merchant bank account. Upon performing the cashout, a cashout processing fee may be collected from the merchant.

In an example embodiment, the payment amount associated with the game and the payment amount associated with the product or the service may be represented in tokens of the global world universal digital mobile and wearable currency. The payments performed using the global world universal digital mobile and wearable currency may include a fingerprint touch recognition payment, a fingerprint press recognition payment, a gesture mark payment, a voice command payment, and a eye blink payment, a fingerprint swipe recognition payment, a nod payment, and so forth.

Figure 3:
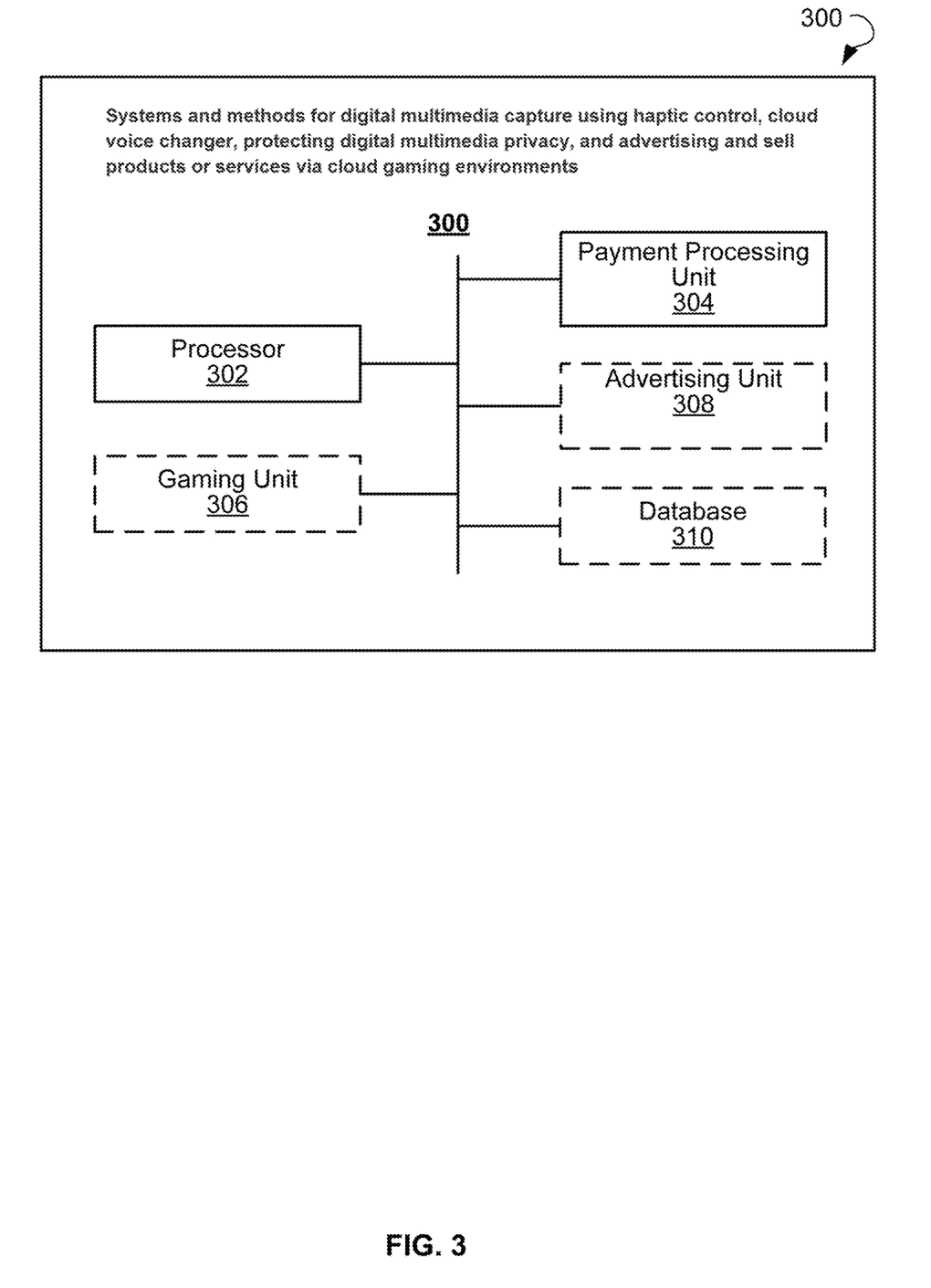
FIG. 3 is a block diagram showing various modules of a system for combining online and offline gaming, advertising, and commerce and providing free games, free products, and free services free of interchange fees, in accordance with certain embodiments.

FIG. 3 is a block diagram showing various modules of a system 300 for combining online and offline gaming, advertising, and commerce and providing free games, free products, and free services free of interchange fees, in accordance with certain embodiments. Specifically, the system 300 may include at least one processor 302. The processor 302 may be operable to receive a buying request from a user. The buying request may be associated with a product or a service provided by a merchant in an online shop. The processor 302 may be further operable to provide an incentive to the user to play a game. The incentive may include a notification displayed to the user. The processor 302 may be further operable to receive an indication that the user intends to play the game. The indication may include a payment request associated with the game. The processor 302 may be further operable to receive results of the game played by the user. Based on the results of the game, the processor 302 may be operable to selectively provide the user with a discount for the product or the service. The discount may be equal to the payment amount associated with the game. Alternatively, the processor 302 may be operable to selectively provide the user, based on the results of the game, with a reward for the product or the service. The reward may be equal to the payment amount associated with the product or the service.

In an example embodiment, the processor 302 may be operable to determine that the user played the game and failed. The paid payment amount associated with the game may be stored in a user virtual wallet in tokens of global world universal digital mobile and wearable currency for further use by the user online or offline without interchange fees. The processor 302 may be operable to hold the paid amount for predetermined period of time before the user can cashout the amount stored in the user virtual wallet. The predetermined period of time includes a period until a game result comes out or a period until the user uses the tokens for further purchases.

The system 300 may include a payment processing unit 304. The payment processing unit 304 may be operable to transfer a payment amount associated with the game from a user account. The user account may be associated with a user virtual wallet. The payment amount associated with the game may constitute a predetermined portion of a payment amount associated with the product or the service.

The payment processing unit 304 may be further operable to receive, from the user, a payment amount associated with the product or the service. The payment amount associated with the product or the service may be calculated based on the discount provided to the user. Additionally, the payment processing unit 304 may be operable to transfer the payment amount associated with the product or the service from the user virtual wallet to a merchant account. The merchant account may be associated with a merchant virtual wallet. Furthermore, the payment processing unit 304 may be operable to transfer the payment amount associated with the game from the user virtual wallet to the merchant virtual wallet. During the transferring of the payment amount associated with the product or the service and/or the payment amount associated with the game the payment processing unit 304 may collect a payment processing fee. The payment processing fee may be collected from the user virtual wallet, the merchant virtual wallet, or from the total amount of money being transferred. The payment processing fee may be set as a predetermined amount, for example, 3%, of a total amount being transferred.

Additionally, the payment processing unit 304 may be operable to receive a cashout request from a merchant. The cashout request may be associated with at least one of the payment amount associated with the product or the service and the payment amount associated with the game. Based on the cashout request, the payment processing unit 304 may transfer the payment amount associated with the product or the service and/or the payment amount associated with the game from the merchant virtual wallet to a merchant personal account, such as a merchant bank account. During processing the cashout request, the payment processing unit 304 may collect a cashout processing fee from the merchant. The cashout processing fee may be set as a predetermined amount, for example, 3%, of a total amount transferred from the merchant virtual wallet.

Both the user and the merchant may be registered in the system 300. Upon registration, the user may receive the user virtual wallet and the merchant may receive the merchant virtual wallet. The user may transfer money from a user personal account, such as a user bank account, to the user virtual wallet. In an example embodiment, the merchant may transfer money from the merchant personal account to the merchant virtual wallet. Additionally, the merchant may use the amount of money stored on the merchant virtual wallet for buying products or services provided for sale by other merchants.

In an example embodiment, money transferred by the user into the user virtual wallet may be stored in the user virtual wallet for a predetermined period, for example, one month, six months, one year, and so forth. After the predetermined period, the user may be able to transfer money from the user virtual wallet to the user bank account.

The system 300 may include a gaming unit 306. The gaming unit 306 may be operable to provide a game interface on a web page associated with the product or the service. The web page may be associated with the online shop in which the merchant provides the product or the service for sale. In some embodiments, the game interface may be controlled by gestures. In an example embodiment, the gestures may be provided via a gesture control interactive visual display associated with product advertising, retail merchandising and point-of-sale promotions. The gesture control interactive visual display may be located on a store window, a digital sign, a wall, a floor, and a cash counter. The gesture control interactive visual display may include one or more of an entertaining 24-hour interactive billboard and an interactive portal to multimedia content, product info, advertisements, and games.

The system 300 may include an advertising unit 308. The advertising unit 308 may be operable to receive, from the merchant, product data or service data. The product data may include product name, product description, product picture, product logo, and the like. The service data may include service name, service description, service picture, service logo, and the like. The product data or the service data may be provided for the purpose of advertising.

The system 300 may include a database 310. The database 310 may include computer-readable instructions for execution by the processor 302. In an example embodiment, the system 300 may be integrated into a client device. The client device may be associated with one or more of the following: a department store, a retailer shop, a hotel, a trade show, a community convention, a travel spot, a theme park, an out door display, an in door display, and other places selling products or services.

In a further example embodiment, the system 300 may be associated with a rewards network and mobile application that offers rewards from third parties, such product providing companies or service providing companies, for virtual achievements. Furthermore, the system 300 may be operable to enables companies to prompt users for commercial offers on virtual achievements. The system 300 may integrate real-world rewards to users of mobile devices having an operating system, such as iOS and Android. Instead of digital rewards, the system 300 may provide the users consumers with tangible rewards from premium companies. The system 300 may be designed for in-game engagement, and allow companies to reward user, such as a mobile gamer, at any "achievement moment", e.g. at any time during the game, such as during winning the game.

In a further example embodiment, a merchant, a user, and a game developer can use the system 300 as a platform as a service, software as a service, infrastructure as a service, or a cloud computing service that provides a computing platform and a solution stack as a service. Furthermore, the system 300 may be associated with a service model of cloud computing. In this service model, the merchant may create an application or a service using tools and/or libraries provided by the system 300. The merchant may also control software deployment and configuration settings. The system 300 may further include networks, servers, storage, and other services required to host the application. Thus, the offerings of the system 300 may facilitate the deployment of applications or services without the cost and complexity of buying and managing the underlying hardware and software and provisioning hosting capabilities. All "as-a-service" offerings of the system 300 may be characterized as providing low initial cost, incremental cost as service usage grows, self-service, best practices built-in, resource sharing, automated deployment, management services, and lifecycle management. In a further example embodiment, the system 300 may be associated with a coupon website. The coupon website may provide a ticket exchangeable for a discount when purchasing a product or a service. The coupons may be issued by merchants of products or services to be used as a part of sales promotions using the Internet, social media, email newsletter, or directly from wearable and mobile devices. Since only price conscious users may be likely to spend the time to claim the savings, coupons may function as a form of price discrimination, enabling the system 300 to offer a lower price only to those users who may otherwise go to other websites. In addition, coupons can also be targeted selectively to regional markets, such as markets of specific locations. In a further example embodiment, the system 300 may be associated with a group buying website, also referred to as a collective buying website. The collective buying website may offer products and services at significantly reduced prices on the condition that a minimum number of users would make the purchase. By featuring a "deal of the day" on the collective buying website, with the deal kicking in once a set number of users agree to buy the product or service. Users can print off a voucher to claim the discount at offline retailer. The group-buying website may work by negotiating deals with local merchants and providing a plurality of users in exchange for discounts.

In a further example embodiment, the system 300 may be associated with a comparison shopping website, also referred to as a price comparison website, comparison shopping agent, shopbot, or comparison shopping engine. The price comparison website may be a vertical search engine that the users use to filter and compare products based on price, features, and other criteria. The system 300 may integrate comparison shopping websites to aggregate product listings from many different merchants. The system 300 can collect product data directly from merchants. Merchants who want to list their products on the system 300 may supply lists of products and prices, and the lists may be matched against one or more databases. The system 300 can also collect product data through a data feed file. The merchants may provide product data electronically in a set format. Additionally, the system 300 may enable price comparison to monetize the products by earning commissions on click through traffic. Additionally, product data from the websites may be indexed to allow the user to search for products on online shopping websites and compare prices between different merchants.

In a further example embodiment, the system 300 may be associated with a gaming website. The gaming website may include a cloud gaming website, a gaming on demand website, an online gaming website based on video streaming, and cloud gaming website based on file streaming. Cloud gaming aims to provide the users with friction-less and direct play-ability of games across various devices. The system 300 may allow direct and on-demand streaming of games onto computers, consoles and mobile devices, similar to video on demand, through the use of a thin client, in which the actual game may be stored on the operator server or the game company server and may be streamed directly to computers accessing the server through the client. This allows access to games without the need of a console and largely makes the capability of the user device unimportant, as the server is a system that is running the processing needs. The controls and button presses from the user may be transmitted directly to the server, where presses may be recorded, and the server then may send back the game response to the input controls. Furthermore, the system 300 may be a game service that takes advantage of a broadband connection, large server clusters, encryption and compression to stream game content to a user device. Users can play games without downloading or installing the actual game. Game content may be stored not on the user hard drive and game code execution may occur primarily at the server cluster, so the user can use a less powerful computer to play the game than the game would normally require, since the server does all performance-intensive operations usually done by the user device.

The system 300 associated with a gaming website may be based on file streaming, also known as progressive downloading, and may deploy a thin client in which the actual game may be run on the user device such. A small part of the game, e.g. less than 5% of the total game size, may be downloaded initially so that the user can start playing quickly. The remaining game content may be downloaded to the user device while playing. This may allow instant access to games with low bandwidth Internet connections without lag. The cloud may be used for providing a scalable way of streaming the game content and data analysis. Additionally, the system 300 may be operable to provide a free online game using a video game played over some network. Additionally, the system 300 may be associated with a multiplayer online gaming websites. The multiplayer online gaming websites may be free to play without requiring a subscription or other payment and may provide client software free of charge and allow users to play the game without requiring payment. The game expenses may be funded by merchants and merchant free products or through donations.

In a further example embodiment, the system 300 may be associated with an online marketing website or an Internet advertising website to enable a form of marketing and advertising which uses the Internet to deliver promotional marketing messages to the users. The marketing and advertising may include email marketing, search engine marketing, social media marketing, many types of display advertising (including web banner advertising), and mobile advertising. The online advertising may involve both a publisher, who integrates advertisements into the content of the publisher, and an advertiser, who provides the advertisements to be displayed on the content of the publisher. Other potential participants may include advertising agencies who help generate and place the advertisement copy, an advertisement server who technologically delivers the advertisement and tracks statistics, and advertising affiliates who do independent promotional work for the advertiser. The advertising messages may be conveyed using text, logos, animations, videos, photographs, or other graphics. In further example embodiments, the system 300 may be associated with an offline physical commercial or non commercial "store-within-a-store" website. The store-within-a-store website may provide products for combining gaming, advertising and shopping together for users in promotional campaigns.

In a further example embodiment, the system 300 may be associated with a lottery ticket website to provide lottery ticket promotion sale in-store or online. When the user comes to a store or is online on the website, the user may pay an upfront fee to get a lottery ticket of a certain amount value. In case the user wins the game, the user may win the product or the service or draw a lottery or raffle. If the user does not win the lottery, the paid amount may be used by the user to buy a product or service in-store or online without any additional charge.

In a further example embodiment, the system 300 may be associated with a sweepstakes website, an instant win game website, a interactive game website to affect user behavior. Therefore, the system 300 may be embraced as a necessary component of a business marketing strategy. Mobile web-commerce companies may use games, i.e. may use gamification, in applications to obtain and retain user attention by publishing the applications suitable for downloading in online stores, such as iOS App Store and Google Play.

Additionally, the at least one processor 302 of the system 300 may be further operable to provide the user with an option to search for the product or the service on a website and compare prices between different merchants. The product data or the service data from the website may be indexed, for example, using a Web Crawler. In an example embodiment, the system 300 may integrate the Google Catalogs with search to give the users more ways to find ideas and inspiration as the users shop and engage with favorite brands.

In a further example embodiment, the system 300 may be associated with one or more of a transactional payment based on Unstructured Supplementary Service Data, Short Message Service, direct operator billing, a credit card mobile payment, an online wallet, a QR code payment, contactless near field communication payment, a cloud-based mobile payment, an audio signal-based payment, a Bluetooth Low Energy signal beacon payment, an in-application payment, a Software Development Kit (SDK) payment, an application programming interface (API) payment, a social networking payment, and a direct carrier and bank co-operation. Furthermore, the system 300 may be compatible with a third party application. Additionally, the system 300 may be associated with one or more of an API and an SDK and adapted to be scanned by a Point-of-Sale system.

Figure 4:
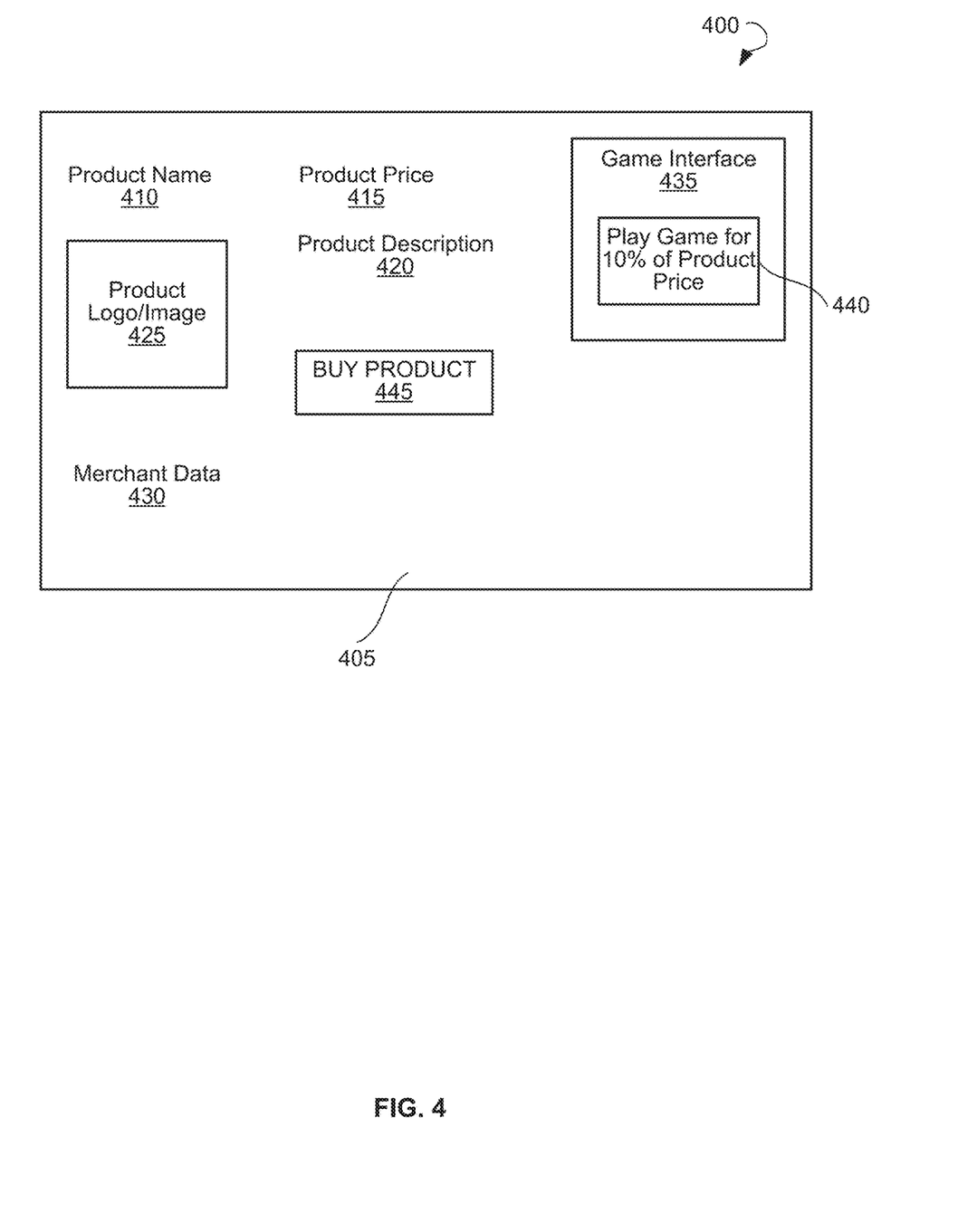
FIG. 4 is a schematic diagram of a user for combining online and offline gaming, advertising, and commerce and providing free games, free products, and free services free of interchange fees, in accordance with certain embodiments.

FIG. 4 is a schematic diagram of a user interface 400 for combining online and offline gaming, advertising, and commerce and providing free games, free products, and free services free of interchange fees. The user interface 400 may show a web page 405 associated with a product provided by the merchant for sale. The web page 405 may display a product name 410, a product price 415, a product description 420, a product logo/image 425, and so forth. Additionally, merchant data 430 may be displayed. Additionally, a game interface 435 may be displayed on the web page 405. The game interface 435 may show an indication 440. By showing the indication 440, the game interface 435 may suggest playing a game for some amount of the product price 415, for example, for the amount of 10% of product price 415. The game interface 435 may be activated by pushing a "buy product" button 445. Alternatively, game interface 435 may be activated upon opening of the web page 405.

Figure 5:
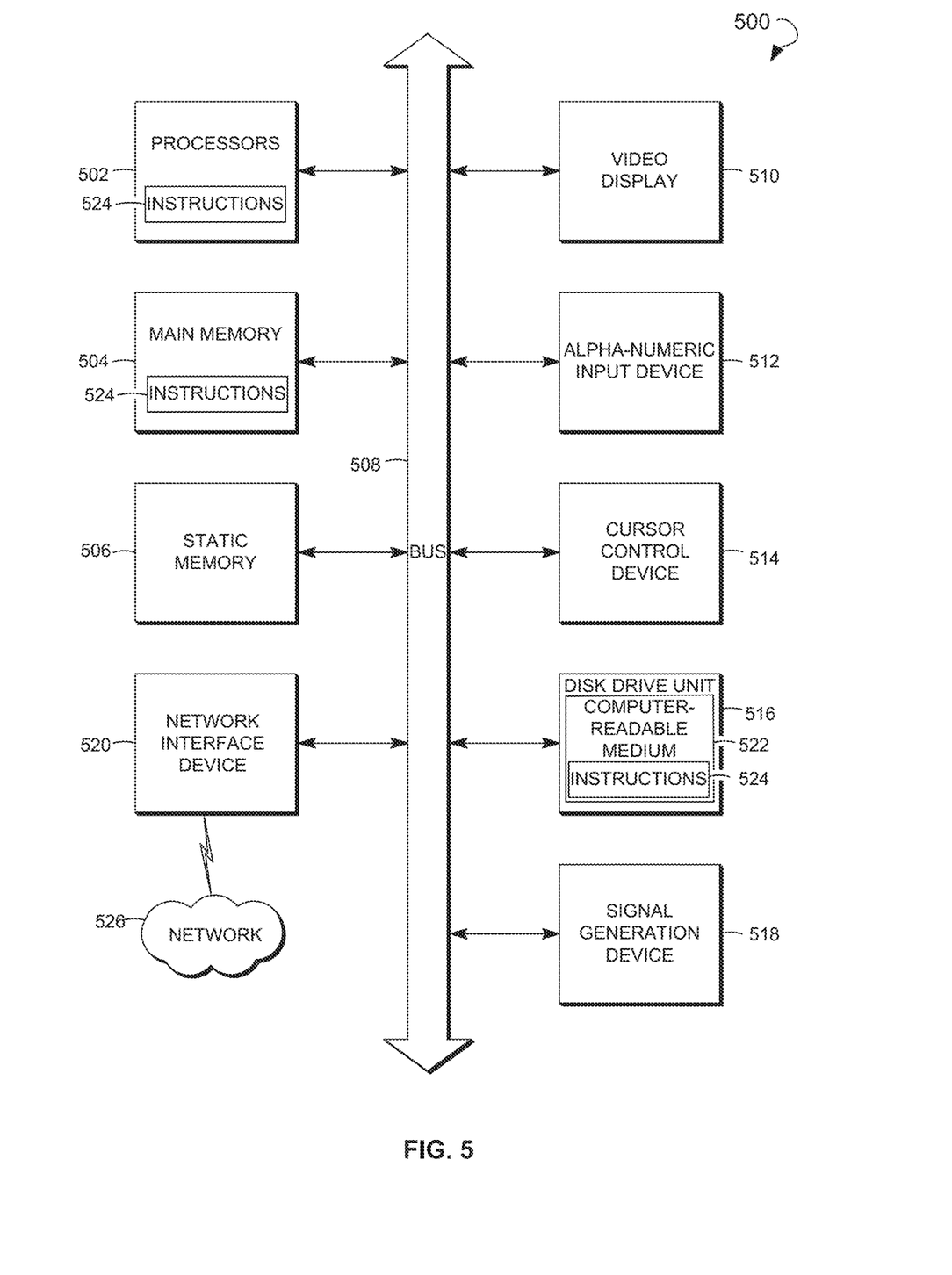
FIG. 5 is a schematic diagram illustrating an example of a computer system for performing any one or more of the methods discussed herein.

FIG. 5 shows a diagrammatic representation of a machine in the example electronic form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 may also include an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for combining online and offline gaming, advertising, and commerce and providing free games, free products, and free services free of interchange fees have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for multimedia capture, encrypting, advertising and selling products or services via cloud gaming environments, the method comprising: receiving, by one or more processors, a first input from a user; based on the input, initiating one or more sensors to capture multimedia to obtain captured multimedia; receiving, by the one or more processors, a second input from the user; analyzing, by the one or more processors, data associated with the first and second inputs; the first and second inputs being received on the wearable digital device by touching a touch display and holding a touch contact of a user finger or stylus for a predetermined time, wherein the touching comprises the first input and a release after the predetermined time comprises a second user input, the analyzing including calculating time between the first user input and the second user input; based on the analysis, selecting one or more multimedia types for recording from the captured multimedia based on predetermined rules associated with the predetermined time; sending a command to a sensor of the wearable digital device to capture video to memory of the selected multimedia type based on the predetermined rules; modify the one or more recorded multimedia types, by a cloud-based voice changing unit, to obtain one or more modified multimedia types; encrypting, via an encryption unit one or more of the recorded multimedia types and the modified multimedia types to prepare the one or more multimedia types for sending; and storing the one or more multimedia types in a memory operable, wherein the cloud-based voice changing unit is coupled to a payment processor coupled; providing an integrated interface for selection of an activity mode, wherein the activity mode includes a messaging mode, a calling mode, and a one-touch payment mode; receiving the selection of the activity mode via the integrated interface from a user; if the messaging mode is selected, receiving a message from the user, the message being sent to a recipient via a data network; and if the calling mode is selected, initiating a data network call on a call request of the user; and if the one-touch payment mode is selected, transmitting a payment request to a financial organization, wherein the payment request is generated using data of an actual page on the mobile and wearable device; and encrypting the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read; wherein the ephemeral messaging, one-touch payment, and multimedia application is associated with an application protocol, the application protocol being integrated into a communication platform; and receiving, from the user, a registration request to register the user in a mobile payment service, wherein the user sends the registration request via a mobile payment application associated with the mobile and wearable device, the mobile payment application providing at least a free VoIP service and a free Over-the-Top (OTT) service; securing the mobile and wearable device comprises via a band to a part of a human body, the part of the human body including a wrist, an arm, a neck, a bead, a leg, a waist, an ear, and a finger, securing, via the band, the mobile and wearable device under, within or on clothing, including a within the band, a rechargeable battery configured to power the mobile and wearable device; operably connecting a database to the wearable digital device; and wherein database stores financial information of the user providing during user registration with the system; wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and controlling access to the mobile and wearable device by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching; wherein the mobile and wearable device further comprises a camera configured to capture one or more codes, the one or more codes including electronic key data, a link to a web-resource, a payment request, and advertising information, wherein the one or more codes include barcode, a linear dimensional code, and a two-dimensional code, a snap tag code, and a QR code; wherein the mobile and wearable device obtains information about a payment system of the user, wherein the mobile and wearable device generates and displays a barcode that encodes user payment information, scanning and processing the barcode at a checkout counter to retrieve the user payment information from a database of a payment processing system, the user payment information being used to transfer funds between the user and the recipient, wherein the recipient is a merchant; associating the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device; wherein the method further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice; and storing one-touch payment information in the mobile card wearable device associated with the user, wherein the user activates the one-touch payment mode by holding the mobile and wearable device near a contactless reader card activating a one-touch payment icon on the mobile and wearable device and makes a secure payment, authorized in part when the location of the payment matches with a determined location of the device, wherein the method comprises, the advertising and selling of products and services via the cloud gaming environments and the multimedia application is associated with an application protocol, the application protocol being integrated into a communication platform, the method further comprising, on the mobile and wearable digital device: providing a gaming software configured to display a third party advertisement in the cloud gaming environment, wherein the third party advertisement is associated with the products or services provided by a third party; receiving, via a user interface associated with a shopping website, a selection of products or services by one or more users to obtain selected products or selected services; based on the selection, providing, by the user interface, to the one or more users an incentive to enter the cloud gaming environment to win the selected products or the selected services receiving one or more requests from the one or more users to activate the gaming software; displaying the third party advertisement, the third party advertisement being associated with the selected products or the selected services; identifying an interaction level of the one or more users with the third party advertisement while the one or more users interact with the cloud gaming environment, wherein the identifying of the interaction level includes: determining presence of one or more factors selected from the group comprising at least: a number of times the one or more users clicked on or otherwise selected one or more fields associated with the third party advertisement; and a number of times a pop up advertisement is displayed to the one or more users, the pop up advertisement including the third party advertisement that at least partially blocks a gaining interface in the cloud gaming environment before receiving a user input, the user input being provided by the one or more users in response to displaying the pop up advertisement to the one or more users; assigning weights to the one or more factors, a weight being assigned to each of the one or more factors; calculating the interaction level, the calculating including summarizing the weights of the one or more factors; and determining a fee payable by the third party based on the interaction level of the one or more users with the third party advertisement; receiving, by an advertising unit, from a merchant associated with a product or a service, product data or service data, the product having a product price and the service having a service price: receiving, by at least one processor, a buying request from a user, the buying request being associated with the product or the service; providing, by the at least one processor, an incentive to the user to play a game, wherein the incentive includes a notification displayed to the user; receiving, by the at least one processor, an indication that the user intends to play the game, the indication including a payment request associated with the game; transferring, by the at least one processor, a payment amount associated with the game from a user account, wherein the payment amount associated with the game constitutes a predetermined portion of a payment amount associated with the product or the service, wherein the user account is associated with a user virtual wallet, the user virtual wallet being associated with a virtual currency; advertising, by the advertising unit, the product or the service to the user, wherein the advertising includes displaying the product data or the service data throughout the game; charging the merchant for the advertising, a charge for the advertising being equal to the product price or the service price; receiving, by the at least one processor, results of the game, the game being played by the user; and based on the results of the game, selectively providing, by the at least one processor, the user with a discount for the product or the service, the discount being equal to the payment amount associated with the game, and collecting a payment processing fee from one or more of the user and a merchant through the use of fingerprint sensors, gestures sensors, voice sensors, and eye sensors of the mobile device.

2. The method of claim 1, further comprising the step of determining that the user failed in the game, wherein the payment amount associated with the game is stored in the user virtual wallet in tokens of the virtual currency for further use by the user online or offline, wherein the virtual currency includes a global world universal digital mobile and wearable currency.

3. The method of claim 1, further comprising the step of providing a game interface on a web page associated with the product or the service, wherein the user is provided with a free processing payment platform providing free games, free products, and free advertising using the product or the service, wherein at least one processor is further operable to provide the user with an option to search for the product or the service on a website, and compare prices between one or more merchants, wherein the product data or the service data from the website is indexed.

4. The method of claim 3, wherein the notification is displayed on the game interface, wherein the game interface is associated with a mobile device game, a tabletop game, a video game, an educational game, a letter game, a multiplayer game, a parlor game, a pervasive game, a puzzle, a skill game, a cloud game, and a kiosk game.

5. The method of claim 1, further comprising the step of receiving, from a merchant, product data or service data, wherein the merchant is associated with the product or the service, wherein the method is associated with a rewards network and mobile application to offer rewards from a third party and a mobile advertising network, wherein the system is provided as one or more as a following: platform as a service, software as a service, and infrastructure as a service, wherein the mobile advertising network prompts the user for commercial offers, wherein the system integrates real-world rewards to the user, wherein the user is associated with a mobile device using an operating system, wherein the operating system includes iOS and Android, wherein the system is associated with providing the user with tangible rewards and in-game engagement, wherein the user is rewarded at a plurality of achievement moments during the game.

6. The method of claim 5, wherein the product data includes one or more of the following: product name, product description, product price, product picture, product logo, and merchant data, and wherein the service data includes one or more of the following: service name, service description, service price, service picture, and service logo.

7. The method of claim 1, wherein the product or the service is provided by a merchant for free for the purpose of advertising, wherein the method is associated with one or more of a coupon website, a collective buying website, a price comparison website, a gaming website, a multiplayer online gaming website, an online marketing website, an Internet advertising website, a store-within-a-store website, a lottery ticket website, a sweepstakes website, an instant win game website, a interactive game website, wherein the coupon website provides a ticket exchangeable for a discount when purchasing a product or a service, wherein the lottery ticket website is associated with lottery ticket promotion sale in-store or online, wherein, if the user is in a store or is online on the lottery ticket website, the lottery ticket website receives an upfront fee from the user for one or more of a lottery ticket of a certain amount value, playing a game to win the product or service, and drawing a lottery or raffle, wherein, if the lottery ticket fails, the upfront fee is stored in the user account for using by the user to buy the product or the service in-store or online without charge.

8. The method of claim 1, wherein the virtual currency is associated with tokens of a global world universal digital mobile and wearable currency, the tokens including a virtual digital note or a virtual digital coin payable on demand, a paper note being a substitute for the coin, wherein the tokens have one-dimensional or two-dimensional black-and-white cluster of dots and squares presenting a code, the code including one or more of a QR-code, a barcode, and a machine readable code, wherein the tokens embed the code within an image, an animation, a video, a text resulting in a combination of the QR-code and multimedia being visually appealing and machine-readable, wherein the tokens are associated with a face detection or a code detection, wherein the virtual digital note or the virtual digital coin include one or more of a currency token, a community token, a city token, a company token, a shop token, a game token, a trade token, a merchant token, a gift token, a staff token, a sales tax token, a slot machine token, and a kiosk token.

9. The method of claim 8, further comprising transferring the payment amount associated with the product or the service from the user virtual wallet, wherein the payment amount associated with the product or the service is calculated based on the discount.

10. The method of claim 9, wherein the payment amount associated with the product or the service is transferred from the user virtual wallet to a merchant account, the merchant account being associated with a merchant virtual wallet.

11. The method of claim 10, wherein the merchant virtual wallet is associated with the virtual currency, wherein the tokens include a joint product of a mutual partnership between the merchant and a token issuer, wherein the tokens represent a merchant name, wherein the tokens are distributed in one or more of a community, a city, a county, a country, a group entity, an institution, an association, a shop, and a company.

12. The method of claim 1, further comprising the step of transferring the payment amount associated with the game from the user virtual wallet to a merchant virtual wallet.

13. The method of claim 1, further comprising: receiving, from a merchant, a cashout request, the cashout request being associated with at least one of the payment amount associated with the product or the service and the payment amount associated with the game; and based on the cashout request, transferring the at least one of the payment amount associated with the product or the service and the payment amount associated with the game from a merchant virtual wallet to a merchant bank account.

14. The method of claim 13, further comprising collecting a cashout processing fee from the merchant further comprising an advertising unit, wherein the advertising unit is operable to receive, from a merchant, product data or service data.

15. The method of claim 1, further comprising collecting a payment processing fee from one or more of the user and a merchant, wherein the virtual currency includes a global world universal digital mobile and wearable currency, wherein the global world universal digital mobile and wearable currency is associated with a fingerprint touch recognition payment, a fingerprint press recognition payment, a gesture mark payment, a voice command payment, and a eye blink payment, a fingerprint swipe recognition payment, and a nod payment, wherein the payment amount associated with the game and the payment amount associated with the product or the service are represented in tokens of the global world universal digital mobile and wearable currency, wherein the tokens are hold on the user account for a predetermined period of time, wherein the predetermined period of time includes a period until a game result comes out and a period until the user uses the tokens for further purchases.

16. The method of claim 1, further comprising, based on the results of the game, selectively providing the user with a reward for the product or the service, the reward being equal to the payment amount associated with the product or the service.

* * * * *